(12) United States Patent
Lancho Doncel

(10) Patent No.: US 10,556,710 B2
(45) Date of Patent: Feb. 11, 2020

(54) LIGHTWEIGHT PASSIVE ATTENUATOR FOR SPACECRAFT

(71) Applicant: AIRBUS DEFENCE AND SPACE, S.A., Madrid (ES)

(72) Inventor: Miguel Lancho Doncel, Madrid (ES)

(73) Assignee: AIRBUS DEFENCE AND SPACE, S.A., Madrid (ES)

( * ) Notice: Subject to any disclaimer, the term of this patent is extended or adjusted under 35 U.S.C. 154(b) by 0 days.

(21) Appl. No.: 15/736,277

(22) PCT Filed: Jun. 16, 2015

(86) PCT No.: PCT/ES2015/070472
§ 371 (c)(1),
(2) Date: Dec. 13, 2017

(87) PCT Pub. No.: WO2016/203067
PCT Pub. Date: Dec. 22, 2016

(65) Prior Publication Data
US 2018/0170584 A1    Jun. 21, 2018

(51) Int. Cl.
*F16F 1/373*    (2006.01)
*F16F 1/34*    (2006.01)
(Continued)

(52) U.S. Cl.
CPC ............. *B64G 1/641* (2013.01); *F16F 1/3732* (2013.01); *F16F 3/0876* (2013.01); *F16F 3/12* (2013.01);
(Continued)

(58) Field of Classification Search
CPC ........ F16F 1/3732; F16F 1/3737; F16F 1/025; F16F 1/027; F16F 1/185; F16F 1/187;
(Continued)

(56) References Cited

U.S. PATENT DOCUMENTS 2,716,011 A * 8/1955 Steimen ................ F16F 15/073
248/616
4,470,608 A * 9/1984 Warren .................. F16J 15/024
277/645

(Continued)

FOREIGN PATENT DOCUMENTS

EP    2628682 A1    8/2013

OTHER PUBLICATIONS

International Search Report for PCT/ES2015/070472, dated Mar. 4, 2016.

*Primary Examiner* — Thomas J Williams
(74) *Attorney, Agent, or Firm* — Merchant & Gould P.C.

(57) ABSTRACT

A lightweight passive attenuator (1) for spacecraft includes two omega cross-section rings (2), placed symmetrically and defining a gap therebetween, and being the main load path of the light passive attenuator (1). A plurality of damper elements (3) are placed in the gap defined between the two omega cross-section rings (2), and not in the main load path of the light passive attenuator (1), such that the omega cross-section rings (2) and the damper elements (3) are assembled at their ends by attachment elements. The omega cross-section rings (2) have a protruding central part (5) with a plurality of holes (6) for connection with adjacent structures (7, 8) of the spacecraft.

5 Claims, 10 Drawing Sheets

(51) Int. Cl.
  *B64G 1/64* (2006.01)
  *F16F 3/087* (2006.01)
  *F16F 3/12* (2006.01)
  *B64G 1/22* (2006.01)

(52) U.S. Cl.
  CPC .......... *B64G 2001/228* (2013.01); *F16F 1/34* (2013.01); *F16F 2224/0208* (2013.01); *F16F 2226/04* (2013.01)

(58) Field of Classification Search
  CPC ...... F16F 1/34; F16F 2234/00; F16F 2234/02; F16F 2234/04; B64G 1/641; B64G 2001/228
  USPC ........ 267/161, 162, 163; 248/568, 569, 560, 248/562, 564, 626, 636; 244/54, 173.2
  See application file for complete search history.

(56) References Cited

U.S. PATENT DOCUMENTS

| | | | | |
|---|---|---|---|---|
| 5,280,889 | A * | 1/1994 | Amil | F16F 1/02 |
| | | | | 248/618 |
| 8,348,031 | B2 * | 1/2013 | Smaldone | A43B 13/183 |
| | | | | 188/372 |
| 9,653,331 | B2 * | 5/2017 | Pylant | H01L 21/67369 |
| 2003/0006341 | A1 | 1/2003 | Buder | |
| 2013/0214464 | A1 * | 8/2013 | Lancho Doncel | F16F 7/00 |
| | | | | 267/140.11 |

* cited by examiner

Detail B
Scale 2:3

(UPPER OMEGA DELETED
FOR BETTER CLARITY)

LIGHTWEIGHT PASSIVE ATTENUATOR FOR SPACECRAFT

This application is a National Stage Application of PCT/ES2015/070472 filed 16 Jun. 2015, which application is incorporated herein by reference. To the extent appropriate, a claim of priority is made to the above disclosed application.

FIELD OF THE INVENTION

This invention refers to a light passive attenuator for spacecraft, used to reduce the shock induced by launcher pyrotechnical separations during the flight.

BACKGROUND OF THE INVENTION

The high level shocks generated by launcher pyrotechnic separations are a problem that has been raised for a long time, and several devices have already been developed by the applicant to reduce these shocks:
- Active systems that physically separate the payload from the rest of the launcher, like GSAD (Generic Shock Attenuation Device). Typically these devices are activated after the stages in which the main loads occur and therefore they are not valid for the attenuation of all the events like the fairing horizontal separations.
- Passive systems that reduce the stiffness and the load path, like PSAD (Passive Shock Attenuation Device). These systems, however, have low load capability (up to 2000 kg).
- Passive system devices that dissipate energy by the movement of a mass, like MFD (Modular Fitting Dummy).

Another proposal is the system known as SASSA (Shock Attenuation System for Spacecraft and Adaptor).

These shock attenuation devices limit the level of shocks induced by the launcher pyrotechnical separations.

The shock induced by pyrotechnic separations of the stages of the launcher may induce damage to the equipments and instruments of the spacecraft.

In addition, low frequency vibrations due to the pressure oscillations inside the solid rocket boosters may be coupled with natural frequencies of the spacecraft, resulting in high load amplifications.

These problems lead to requalification and reinforcement of the equipments of the spacecraft, penalizing cost and mass.

SUMMARY OF THE INVENTION

The object of the present invention is to provide a light passive attenuator for spacecraft that improves the shock reduction induced by launcher pyrotechnical separations during the flight and reduces low frequency vibrations, keeping the carrying load capability of the current attenuators.

The invention provides a light passive attenuator for spacecraft, which comprises:
- two omega cross-section rings, placed symmetrically and defining a gap therebetween, being the main load path of the light passive attenuator, and
- a plurality of damper elements placed in the gap defined between the two omega cross-section rings and not in the main load path of the light passive attenuator,
such that the omega cross-section rings and the damper elements are assembled at their ends by means of attachment means, and the omega cross-section rings have a protruding central part with a plurality of holes for connection with the adjacent structures of the spacecraft.

The light passive attenuator of the invention is a passive system that dissipates energy by a combination of the spring formed by the two omega cross-section rings and the damper elements, working in parallel, which provides the dynamic payload isolation by a combination of elastic and damping elements.

Accordingly, this energy dissipation contributes to reduce the shock level propagation and low frequency vibrations.

The damper elements are mastered by the omega cross-section rings, and therefore the invention takes the benefit of the damping properties of the elastomers but minimizing their non-linear stiffness when submitted to different frequencies of excitation, temperature and load levels.

The omega cross-section rings are continuous elements. Accordingly, the continuous and uniform design of the light passive attenuator of the invention along the perimeter does not generate peak loads to the adjacent structures.

The invention also provides a relevant reduction of the mass and the height of the device, without inducing overfluxes to the adjacent structures.

Other characteristics and advantages of the present invention will be clear from the following detailed description of several embodiments illustrative of its object in relation to the attached figures.

DETAILED DESCRIPTION OF THE INVENTION

Figure 1:
FIG. 1 shows a general perspective view of the light passive attenuator for spacecraft of the invention.
Figure 2:
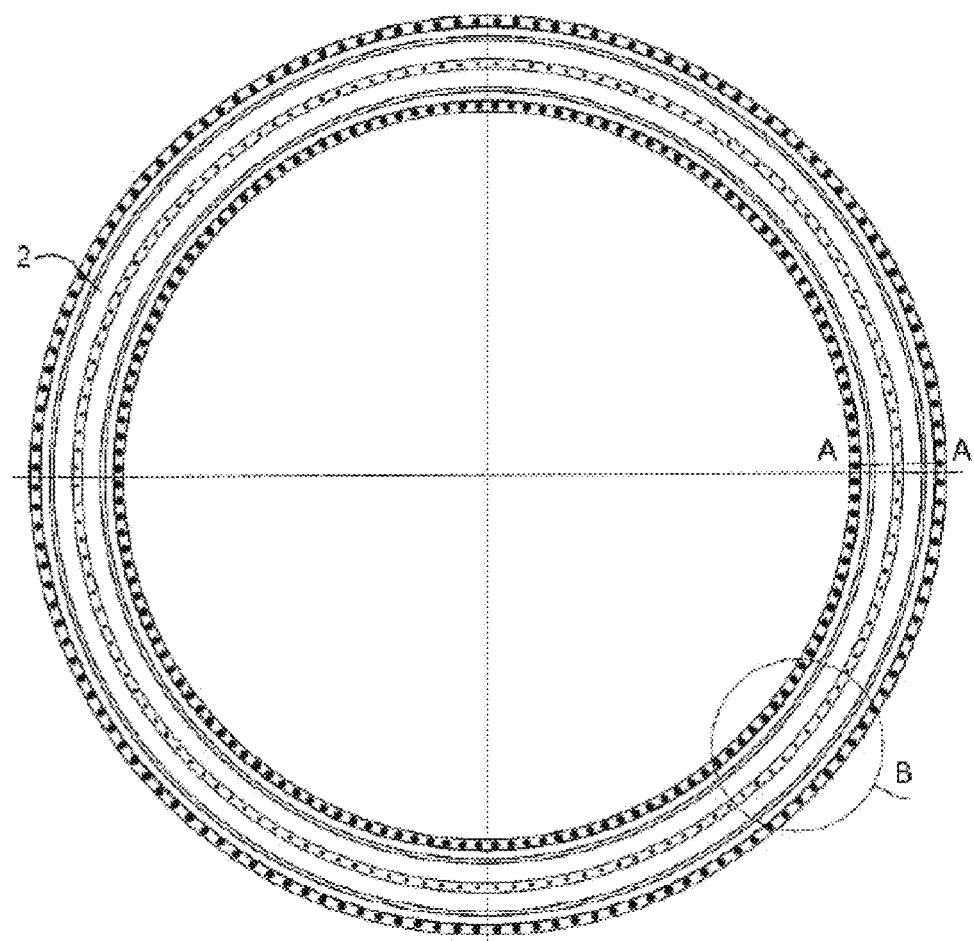
FIG. 2 shows a top view of the light passive attenuator for spacecraft of the invention.

FIG. 1 shows a perspective view of the light passive attenuator 1 for spacecraft of the invention. It is mainly formed by two omega cross-section rings 2 placed symmetrically. Between the two omega-cross rings 2 there is a gap, where a plurality of damper elements 3 are placed.

The two omega cross-section rings 2 are the main load path of the light passive attenuator 1 and are in charge of providing the stiffness.

Figure 8:
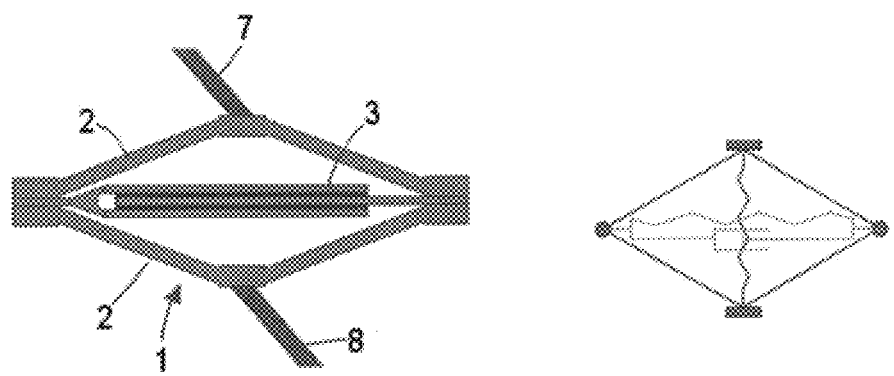
FIG. 8 is a view of the working principle of the light passive attenuator of the invention.
Figure 9:
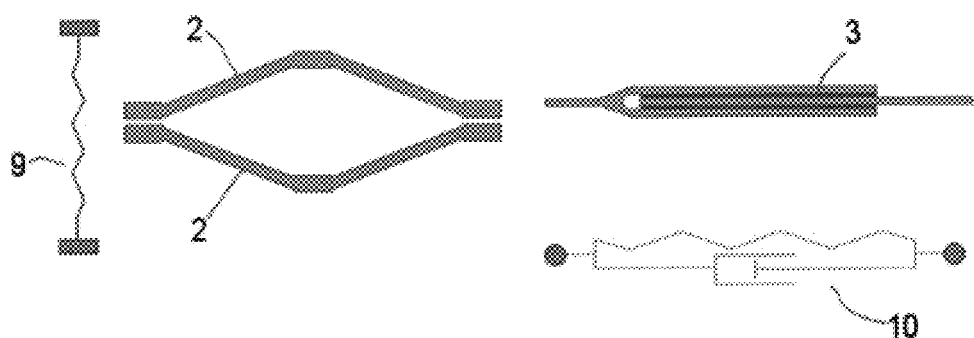
FIG. 9 shows the spring and damper elements of the invention.
Figure 10:
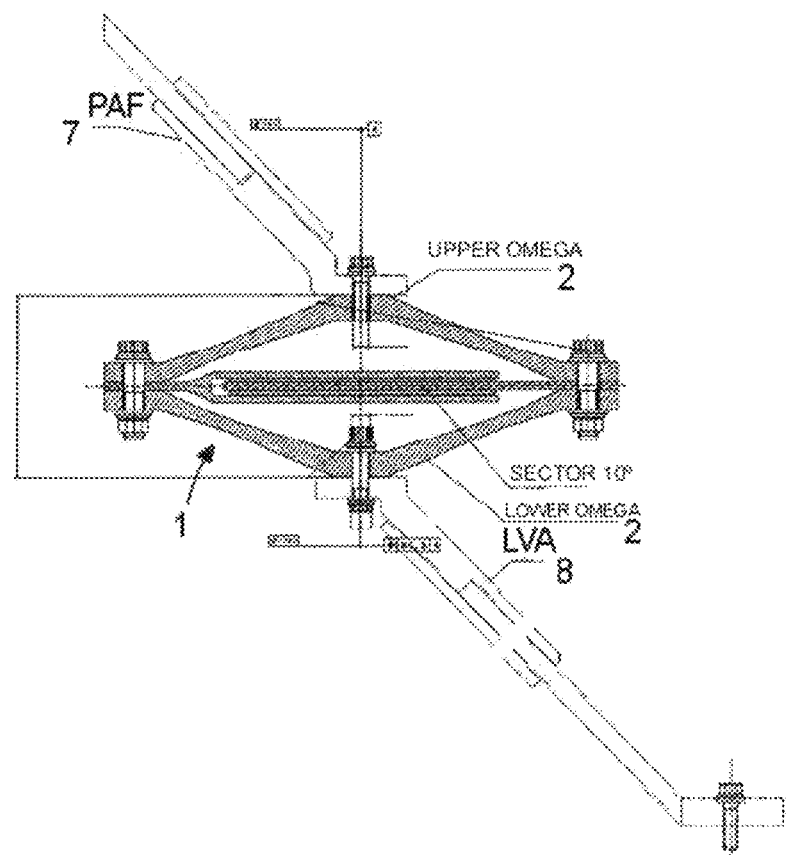
FIG. 10 shows an assembly of the light passive attenuator of the invention with the adjacent structures.

The two omega cross-section rings 2 are continuous elements which are assembled face to face. The damper elements 3 are placed in parallel with the omega cross-section rings 2, i.e., they are not in the main load path of the light passive attenuator 1. The dynamic payload isolation is obtained by a combination of elastic and damping elements (see FIGS. 8 and 9, which show the spring 9 and damper 10 elements of the light passive attenuator 1).

Figure 11:
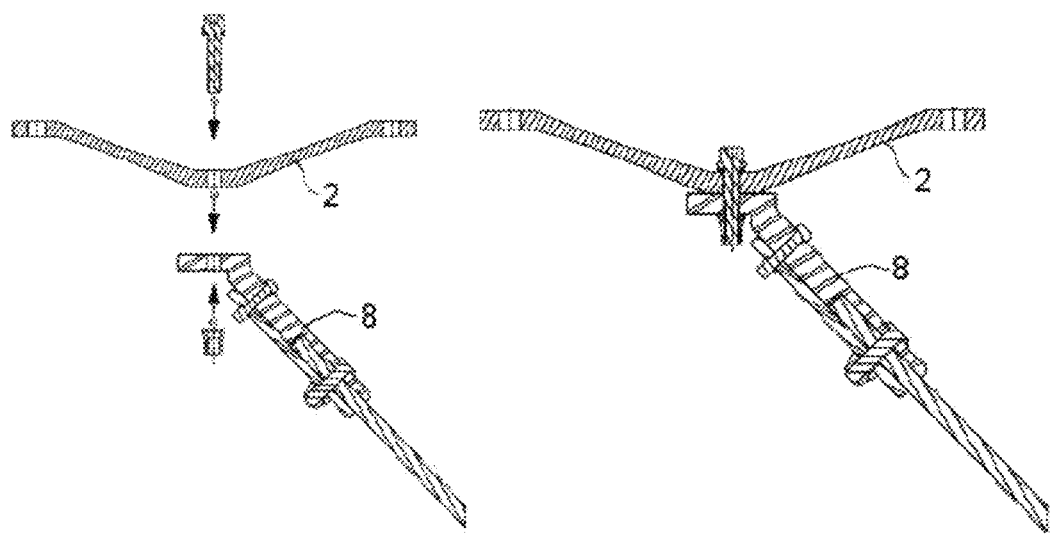
FIGS. 11 and 12 show the assembly of the lower omega cross-section ring with the adjacent structure.
Figure 12:
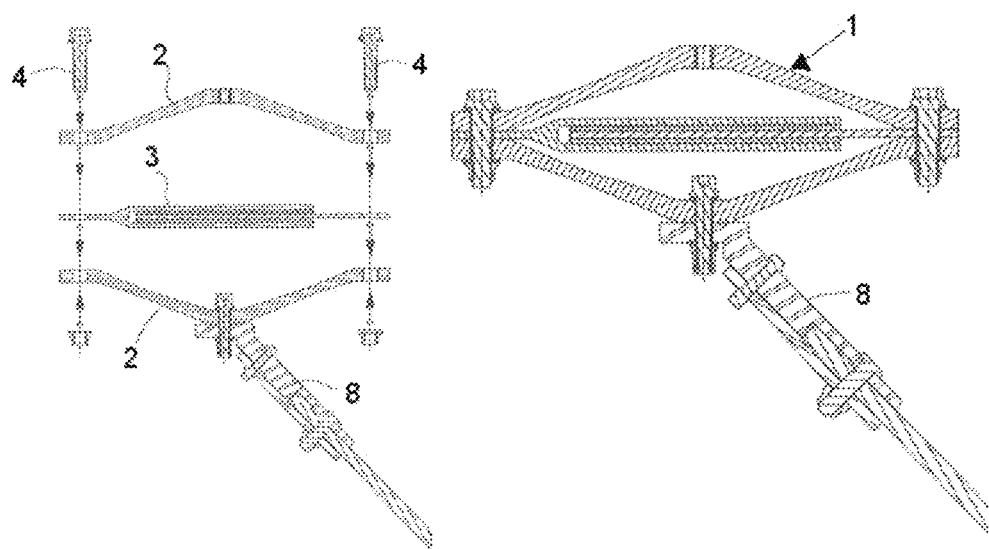
Figure 13:
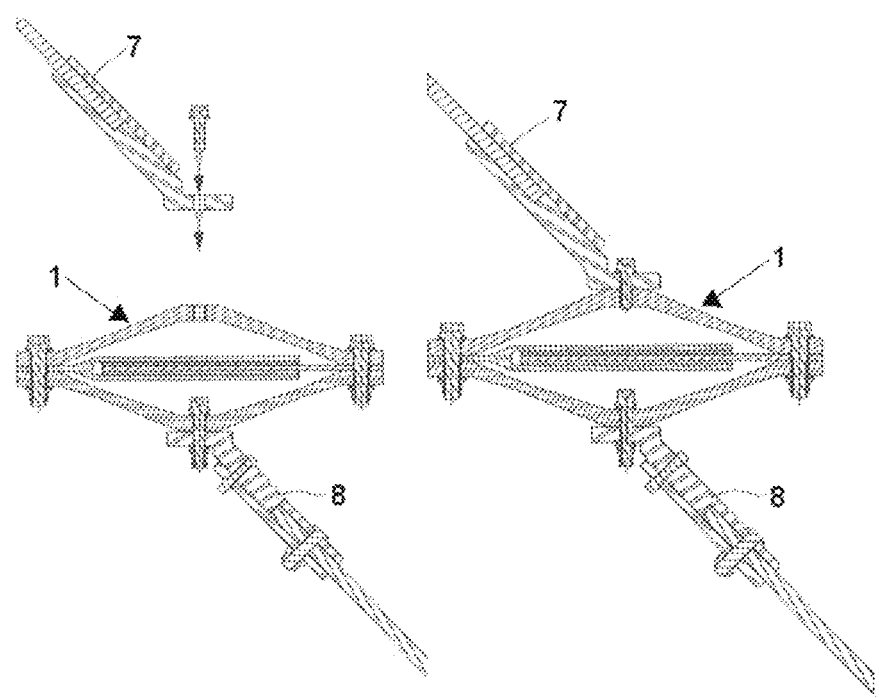
FIG. 13 shows the assembly of the upper omega cross-section ring with the adjacent structure, and the final assembly of the light passive attenuator of the invention.

The omega cross-section rings 2 and the damper elements 3 are assembled at their ends by means of attachment means 4 (see for instance FIGS. 11 to 13).

Figure 5:
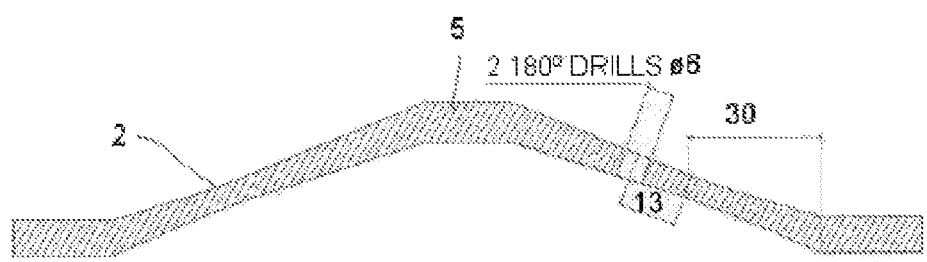
FIG. 5 is a cross section of an omega cross-section ring of the invention.

An omega cross-section ring 2 is represented in FIG. 5. It has a protruding central part 5 with a plurality of holes 6 for connection with the adjacent structures 7, 8 of the spacecraft.

The omega cross-section rings 2 are preferably metallic and the damper elements 3 may contain elastomers to improve the isolation performance. The damper elements 3 may be made of aluminium and vulcanized elastomer working in double shear (see FIGS. 6 and 7).

Figure 3:
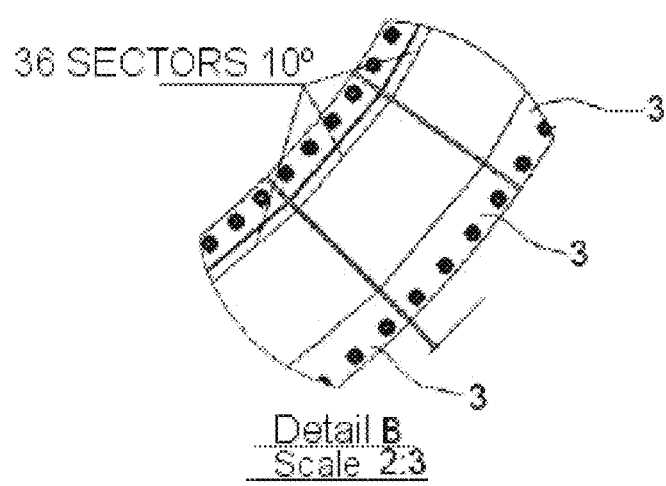
FIG. 3 is a detail of FIG. 2, without one of the omega cross-section rings, showing damper elements of the invention.
Figure 6:
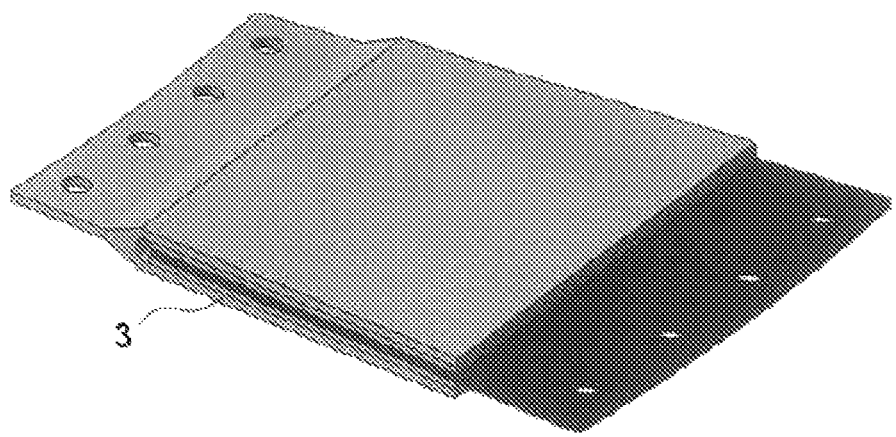
FIG. 6 is a perspective view of a damper element of the invention.
Figure 7:
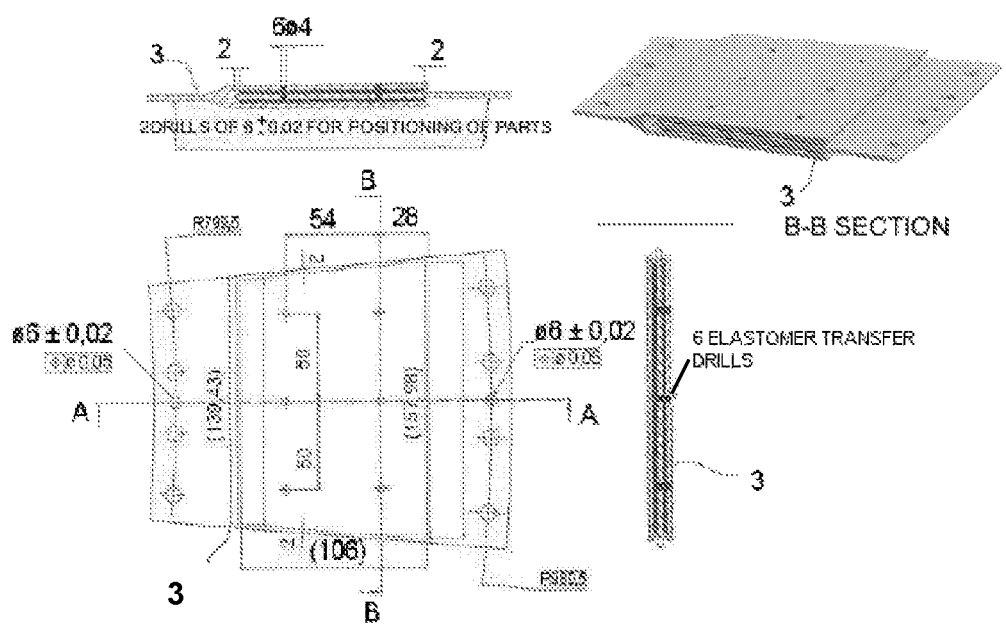
FIG. 7 is a plan view of a damper element of the invention.

Preferably, there are 36 damper elements 3 of approximately 10° (see FIGS. 3, 6 and 7).

Figure 4:
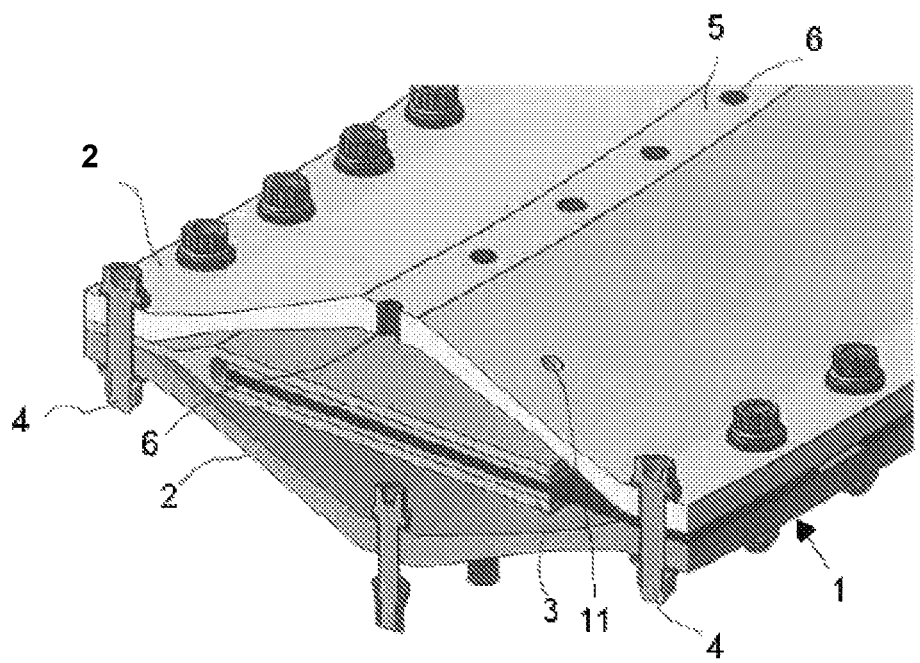
FIG. 4 is a detailed assembly view of the light passive attenuator for spacecraft of the invention.

According to an embodiment, the omega cross-section rings 2 and the damper elements 3 are assembled at their ends by means of bolts (see FIG. 4).

According to another embodiment, one of the omega cross-section rings 2 has at least two venting holes 11 (see FIG. 4).

In FIG. 5 it can be seen that the parts of the omega cross-section rings 2 that connect their ends to their protruding central parts 5 can have a variable thickness with a thinner central portion, and the thickness at their ends can be less than the thickness at their protruding central parts 5.

FIGS. 11 to 13 show the assembly process of the light passive attenuator components, and of the light passive attenuator 1 with the adjacent structures 7, 8.

The first step (FIG. 11) consists in the assembly of the lower omega cross-section ring 2 with the adjacent structure 8.

The second step (FIG. 12) consists in the assembly of the damper elements 3 and the upper omega cross-section ring 2 with the lower omega cross-section ring 2.

The third step (FIG. 13) consists in the assembly of the upper adjacent structure 7 with the upper omega cross-section ring 2.

Several tests have been carried out to check the correct performance of the light passive attenuator 1 for spacecraft of the invention. Specifically, shock tests and sine vibration tests have been carried out, comparing the transmission with and without the light passive attenuator 1 to evaluate its efficiency.

Figure 14:
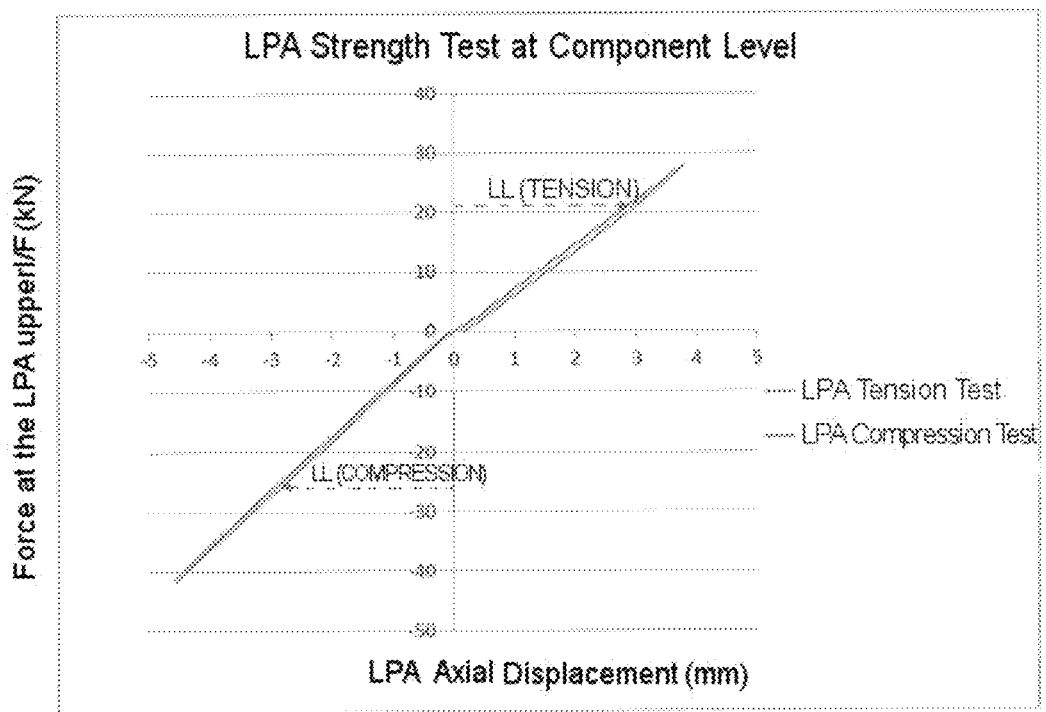
FIG. 14 shows the results of a stiffness test at subscale level.

FIG. 14 shows the results of a stiffness test at subscale level. There is good stiffness linearity of the light passive attenuator 1 with respect to load level in spite of the elastomer beyond the limit load (LL).

Figure 15:
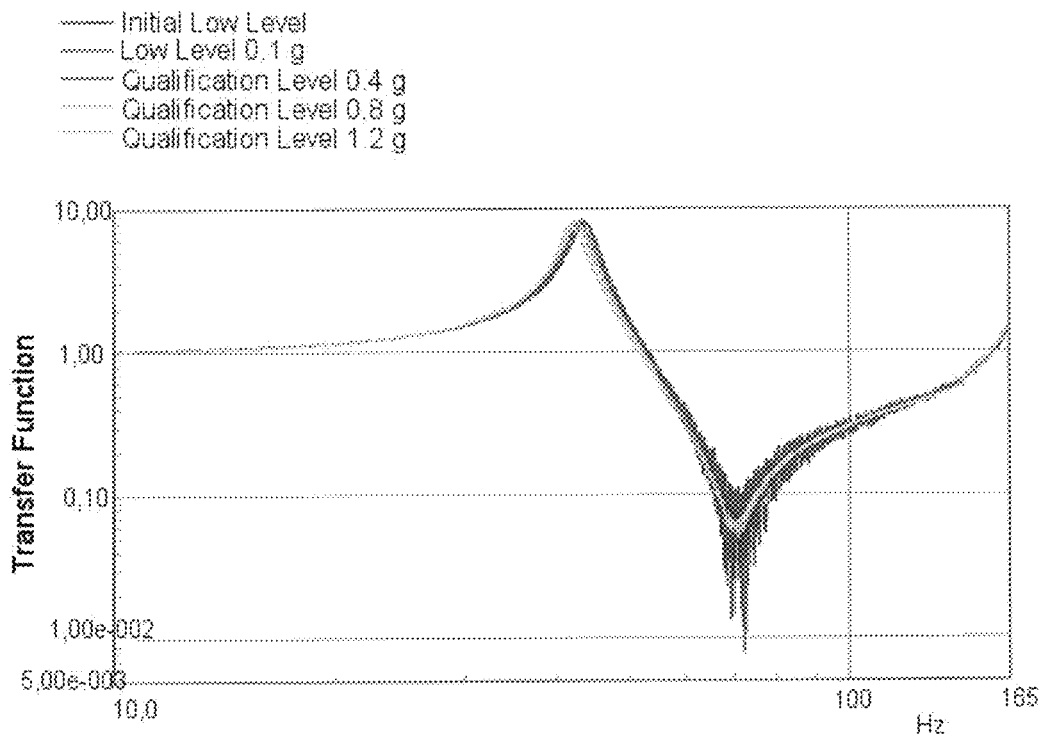
FIG. 15 shows the results of a sine vibration test at full scale level.

FIG. 15 shows the results of a sine vibration test at full scale level. As it can be seen, there is a good stability of the stiffness and damping with respect to load level. Good damping is obtained (low amplification factor Q value <10; see the table below):

| Level (g) | 1st Lateral Frequency (Hz) | Amplification Q |
|---|---|---|
| 0.1 | 43.6 | 8.1 |
| 0.4 | 43.0 | 8.0 |
| 0.8 | 42.4 | 8.0 |
| 1.2 | 41.7 | 7.8 |
| 0.1 | 43.6 | 8.1 |

Figure 16:
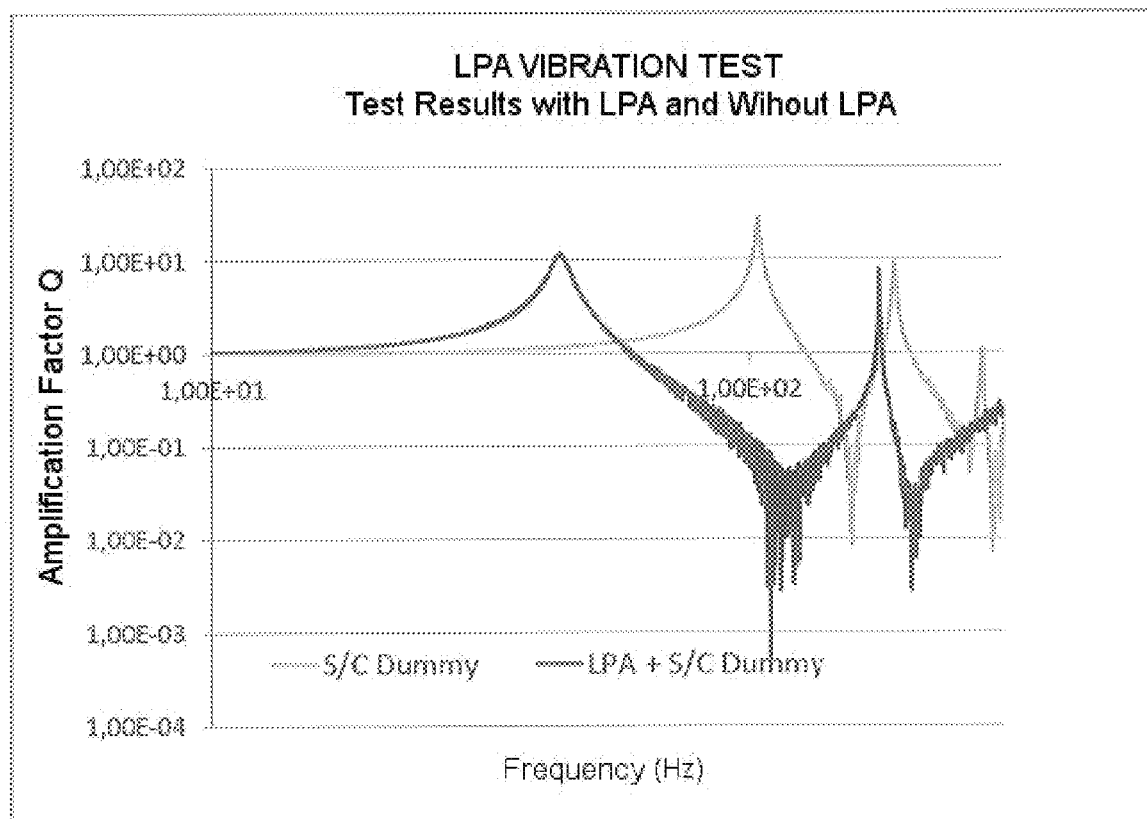
FIG. 16 shows the results of a sine vibration test at full scale level with and without LPA.

FIG. 16 shows the results of a sine vibration test at full scale level with and without LPA 1. As it can be seen, there is a good reduction of the amplification at the first mode (factor of reduction >2).

Figure 17:
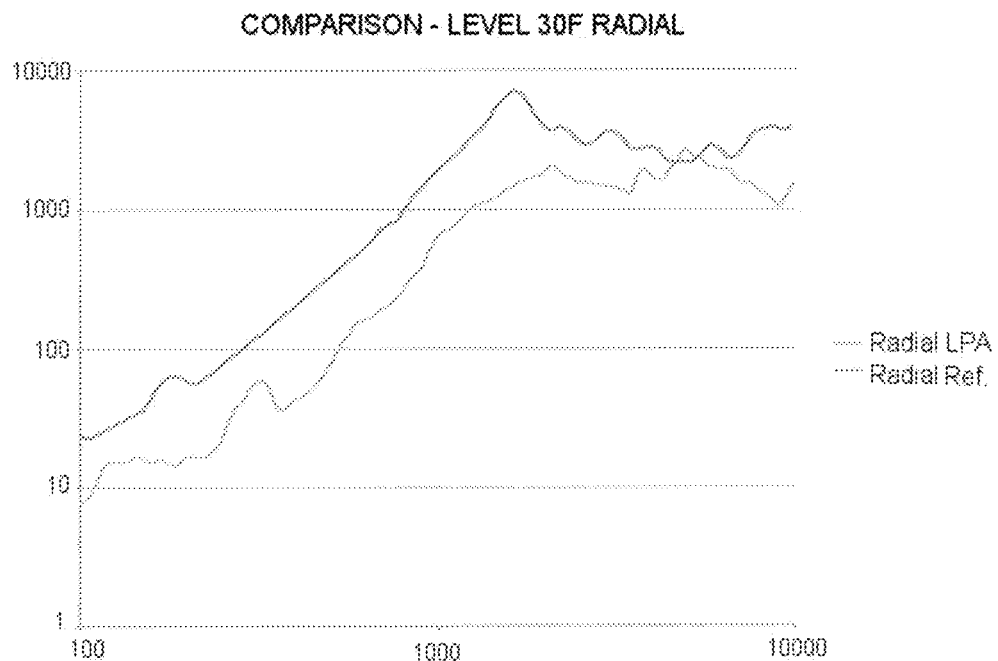
FIGS. 17 and 18 show shock test results with and without the light passive attenuator (LPA) of the invention.
Figure 18:
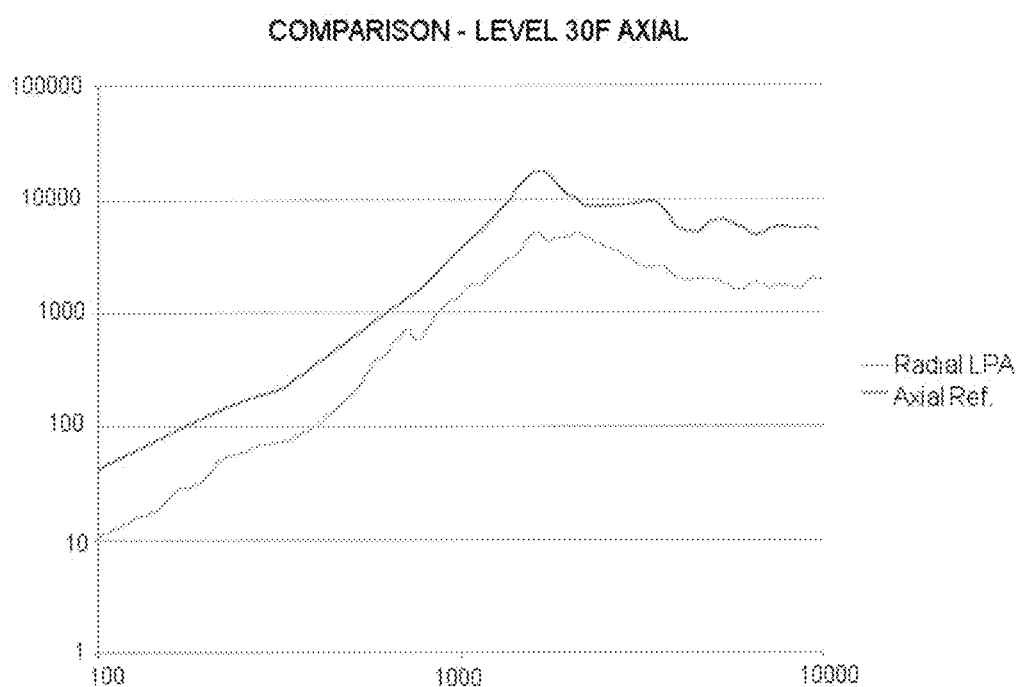

FIGS. 17 and 18 show shock test results with and without the light passive attenuator (LPA) of the invention. The shock filtering efficiency is proven by test (9 dB in radial and axial accelerations).

Accordingly, the light passive attenuator 1 of the invention has the following features:
Very simple design, manufacturing and installation.
Payload domain up to 6400 kg with lateral frequency higher than 6 Hz.
Low height (less than 75 mm) and low mass (less than 75 kg).
Linear stiffness up to the limit load of the elastomer and beyond.
It does not induce overfluxes to the adjacent structures.
Good reduction of the amplification of the main modes (factor of reduction>2).
Good shock attenuation (−9 dB in radial and axial).

The light passive attenuator 1 is preferably placed at the 1780 mm interface diameter. However, its concept could be easily scaled to other interface diameter of the launcher.

Although the present invention has been fully described in connection with preferred embodiments, it is evident that modifications may be introduced within the scope thereof, not considering this as limited by these embodiments, but by the contents of the following claims.

The invention claimed is:

1. A lightweight passive attenuator for spacecraft, comprising:
two metallic omega cross-section rings, placed symmetrically and defining a gap therebetween, the two omega cross-section rings being a main load path of the lightweight passive attenuator, and
a plurality of damper elements placed in the gap defined between the two omega cross-section rings and out of the main load path of the lightweight passive attenuator,
wherein the omega cross-section rings and the damper elements are assembled at ends by attachment means, and the omega cross-section rings have a protruding central part with a plurality of holes for connection with adjacent structures of the spacecraft;
wherein the damper elements comprise aluminum and vulcanized elastomer.

2. The lightweight passive attenuator for spacecraft, according to claim 1, comprising 36 of the damper elements of approximately 10°.

3. The lightweight passive attenuator for spacecraft, according to claim 1, wherein the omega cross-section rings and the damper elements are assembled by bolts.

4. A lightweight passive attenuator for spacecraft, comprising:
two metallic omega cross-section rings, placed symmetrically and defining a gap therebetween, the two omega cross-section rings being a main load path of the lightweight passive attenuator; and a plurality of damper elements placed in the gap defined between the two omega cross-section rings and out of the main load path of the lightweight passive attenuator;

wherein the omega cross-section rings and the damper elements are assembled at ends by attachment means, and the omega cross-section rings have a protruding central part with a plurality of holes for connection with adjacent structures of the spacecraft; and wherein parts of the omega cross-section rings that connect the ends to the protruding central parts have a variable thickness with a thinner central portion, and the thickness at their ends is less than the thickness at the protruding central parts.

5. A lightweight passive attenuator for spacecraft, comprising:

two metallic omega cross-section rings, placed symmetrically and defining a gap therebetween, the two omega cross-section rings being a main load path of the lightweight passive attenuator; and a plurality of damper elements placed in the gap defined between the two omega cross-section rings and out of the main load path of the lightweight passive attenuator;

wherein the omega cross-section rings and the damper elements are assembled at ends by attachment means, and the omega cross-section rings have a protruding central part with a plurality of holes for connection with adjacent structures of the spacecraft; and wherein one of the omega cross-section rings has at least two venting holes.

* * * * *